(12) United States Patent
Drader et al.

(10) Patent No.: US 10,379,619 B2
(45) Date of Patent: Aug. 13, 2019

(54) METHOD AND DEVICE FOR CONTROLLING AN APPARATUS USING SEVERAL DISTANCE SENSORS

(71) Applicants: STMicroelectronics SA, Montrouge (FR); STMicroelectronics (Grenoble 2) SAS, Grenoble (FR)

(72) Inventors: Marc Drader, Lans en Vercors (FR); Jérémie Teyssier, Grenoble (FR); Olivier Pothier, Sceaux (FR)

(73) Assignees: STMicroelectronics SA, Montrouge (FR); STMicroelectronics (Grenoble 2) SAS, Grenoble (FR)

(*) Notice: Subject to any disclaimer, the term of this patent is extended or adjusted under 35 U.S.C. 154(b) by 402 days.

(21) Appl. No.: 14/553,216

(22) Filed: Nov. 25, 2014

(65) Prior Publication Data

US 2015/0145768 A1    May 28, 2015

(30) Foreign Application Priority Data

Nov. 27, 2013 (FR) ...................................... 13 61712

(51) Int. Cl.
| | |
|---|---|
| *G06F 3/042* | (2006.01) |
| *G06F 3/01* | (2006.01) |
| *G01C 9/06* | (2006.01) |
| *G01B 11/14* | (2006.01) |
| *G06F 3/03* | (2006.01) |
| *G01S 17/08* | (2006.01) |
| *G01S 17/87* | (2006.01) |

(52) U.S. Cl.
CPC .............. *G06F 3/017* (2013.01); *G01B 11/14* (2013.01); *G01C 9/06* (2013.01); *G01S 17/08* (2013.01); *G01S 17/875* (2013.01); *G06F 3/0325* (2013.01); *G06F 3/0421* (2013.01); *G01C 2009/066* (2013.01)

(58) Field of Classification Search
CPC ...... G06F 3/0421; G06F 3/017; G06F 1/1694; G06F 3/0346
USPC .................................................. 345/156–184
See application file for complete search history.

(56) References Cited

U.S. PATENT DOCUMENTS

| | | | |
|---|---|---|---|
| 2010/0295773 A1 | 11/2010 | Alameh et al. | |
| 2013/0153754 A1 | 6/2013 | Drader et al. | |
| 2013/0175435 A1 | 7/2013 | Drader | |
| 2014/0035805 A1* | 2/2014 | Minnen | G06F 3/017 345/156 |
| 2015/0062056 A1* | 3/2015 | Sood | G06F 3/044 345/174 |
| 2015/0090884 A1* | 4/2015 | Bouchilloux | G01S 17/46 250/341.8 |

\* cited by examiner

*Primary Examiner* — Dennis P Joseph
(74) *Attorney, Agent, or Firm* — Seed IP Law Group LLP (57) ABSTRACT

A method for controlling an apparatus, includes steps of: determining distance measurements of an object in a first direction, using distance sensors defining between them a second direction different from the first direction, assessing a first inclination of the object in relation to a second direction based on the distance measurements, and determining a first command of the apparatus according to the inclination assessment.

23 Claims, 3 Drawing Sheets

METHOD AND DEVICE FOR CONTROLLING AN APPARATUS USING SEVERAL DISTANCE SENSORS

BACKGROUND

Technical Field

The present disclosure relates to a method and a device for controlling an apparatus such as a computer, a smartphone, a digital tablet, a GPS navigation device, a large display screen, a set-top box, etc.

Description of the Related Art

For this purpose, one well-known method involves using a pointing device such as a mouse or a tactile surface which can be arranged on the display screen of the apparatus. However, using a mouse is not suited to small apparatuses such as smartphones, digital tablets and navigation devices. Using a mouse is not suited either to the introduction of commands in connection with an image displayed remotely on a television set. Tactile surfaces arranged on a display screen can be soiled and thus affect the visibility of the screen. Some apparatuses such as smartphones can be equipped with a pico projector projecting an image. A tactile surface is thus not suited to generating commands from finger movements in connection with the image projected. Furthermore, tactile surfaces must have a certain minimum surface area. They are not suited either to the introduction of commands on a conventional size remote control in connection with an image remotely displayed on a large screen.

Furthermore, distance measurement devices exist which assess a distance with an object based on a propagation time of a photon beam emitted in the form of pulses and reflected on the object. For this purpose, these devices light up a detection field with a pulsed light source such as a pulsed laser source, and detect photons reflected by an object present in the detection field. To detect the reflected photons, these devices can comprise one or more reverse biased photodiodes so that an avalanche phenomenon occurs upon receiving a flow of photons. Each of the measurement devices may also comprise one or more single photon avalanche diodes (SPAD) each being capable of generating a detection signal upon receiving a photon having particular characteristics (e.g., a unique photon). The distance of the object present in the detection zone is assessed on the basis of the propagation time or time of flight (TOF) between the instant of emission of a light pulse and the instant a pulse appears in the signal supplied by the detection device. The measurement accuracy depends particularly on the duration of the light pulses emitted by the source, and the shorter these pulses are, the more accurate the measurement can be. However, the accuracy that can be obtained with such a distance measuring device proves insufficient to detect finger movements such as those made on a tactile surface.

BRIEF SUMMARY

Some embodiments relate to a method for controlling an apparatus, comprising steps of: determining distance measurements of an object in a first direction, using distance sensors defining between them a second direction different from the first direction, assessing a first inclination of the object in relation to a second direction based on the distance measurements, and determining a first command of the apparatus according to the inclination assessment.

According to one embodiment, the method comprises steps of: determining distance measurements of the object in the first direction, from distance sensors defining between them a third direction different from the first and second directions, assessing a second inclination of the object in relation to the third direction based on the distance measurements from the distance sensors defining the third direction, and determining a second command of the apparatus according to the inclination assessment in the third direction.

According to one embodiment, the method comprises steps of: determining a distance measurement of the object in the first direction, from a distance sensor not aligned with the distance sensors defining between them the second direction, assessing a second inclination of the object in relation to a third direction different from the first and second directions, based on the distance measurements supplied by all the distance sensors, and determining a second command of the apparatus according to the inclination assessment in the third direction.

According to one embodiment, the distance sensors are oriented along different axes, the distance measurements being obtained by projecting measurements supplied by the distance sensors on the first direction, taking into account angles between each of the axes and the first direction.

According to one embodiment, each distance measurement supplied by each of the distance sensors is obtained by assessing a duration between an instant of emission of a pulse of photons by the distance sensor towards the object and an instant of detection of a pulse of photons reflected by the object and detected by the distance sensor.

According to one embodiment, the first and/or the second command is determined according to inclination variations determined based on the inclination assessments.

Some embodiments also relate to a device for controlling an apparatus, comprising: distance sensors each configured to measure a distance between the distance sensor and an object to be detected, and a control circuit configured to: determine distance measurements of the object in a first direction, using the distance sensors that define between them a second direction different from the first direction, assess a first inclination of the object in relation to the second direction based on the distance measurements, and determine a first command of the apparatus according to the inclination assessment.

According to one embodiment, the device comprises distance sensors defining between them a third direction different from the first and second directions, the control circuit being configured to: determine distance measurements of the object in the first direction, from the distance sensors, assess a second inclination of the object in relation to the third direction based on the distance measurements obtained from the distance sensors defining the third direction, and determine a second command of the apparatus according to the inclination assessment in the third direction.

According to one embodiment, the device comprises a distance sensor not aligned with the distance sensors defining between them the second direction, the control circuit being configured to: determine a distance measurement of the object in the first direction, from the distance sensor not aligned with the distance sensors defining between them the second direction, assess a second inclination of the object in relation to a third direction different from the first and second directions, based on the distance measurements supplied by all the distance sensors, and determine a second command of the apparatus according to the inclination assessment in the third direction.

According to one embodiment, the distance sensors are oriented along different axes, the distance measurements being obtained by projecting measurements supplied by the distance sensors on the first direction, taking into account angles between each of the axes and the first direction.

According to one embodiment, each distance sensor comprises a pulsed light source and light-sensitive elements, and is configured to assess a duration between an instant of emission of a pulse of photons by the light source towards the object and an instant of detection of a pulse of photons reflected by the object and detected by the light-sensitive elements.

According to one embodiment, the light-sensitive elements are SPAD diodes.

According to one embodiment, the control circuit is configured to determine the first and/or the second command according to inclination variations determined based on the inclination assessments.

According to one embodiment, the device comprises a number of distance sensors greater than or equal to three in each direction in relation to which the control circuit assesses an inclination.

In an embodiment, a method comprises: determining distance measurements to an object in a first direction, using distance sensors defining between them a second direction different from the first direction; assessing a first inclination of the object in relation to the second direction based on the distance measurements; and determining a first command of an apparatus based on the first inclination assessment. In an embodiment, the method includes: determining distance measurements to the object in the first direction, from distance sensors defining between them a third direction different from the first and second directions; assessing a second inclination of the object in relation to the third direction based on the distance measurements from the distance sensors defining the third direction, and determining a second command of the apparatus based on the second inclination assessment. In an embodiment, the method includes: determining a distance measurement of the object in the first direction, from a distance sensor not aligned with the distance sensors defining between them the second direction; assessing a second inclination of the object in relation to a third direction different from the first and second directions, based on the distance measurements supplied by the distance sensors; and determining a second command of the apparatus according to the second inclination assessment in the third direction. In an embodiment, the distance sensors are oriented along different axes, the distance measurements being obtained by projecting measurements supplied by the distance sensors on the first direction, taking into account angles between each of the axes and the first direction. In an embodiment, a distance measurement supplied by a distance sensor is obtained based on a duration between an instant of emission of a pulse of photons by the distance sensor toward the object and an instant of detection of a pulse of photons reflected by the object and detected by the distance sensor. In an embodiment, at least one of the first and the second command is determined according to inclination variations determined based on the inclination assessments.

In an embodiment, a device comprises: a plurality of distance sensors to, in operation, measure distances between the distance sensors and an object to be detected; and a control circuit communicatively coupled to the plurality of distance sensor, which, in operation: receives indications of the distance measurements from the distance sensors; determines one or more inclinations of the object in relation to one or more directions based on the received indications of the distance measurements; and generates one or more command signals based on the determined inclinations. In an embodiment, the control circuit, in operation, receives indications of distance measurements to the object in a first direction from distance sensors of the plurality of distance sensors that define a second direction different from the first direction; determines a first inclination of the object in relation to the second direction based on the received distance measurements from the distance sensors that define a second direction; and generates a first command signal based on the determined first inclination. In an embodiment, in operation, the control circuit, receives indications of distance measurements to the object in the first direction from distance sensors of the plurality defining a third direction different from the first and second directions; determines a second inclination of the object in relation to the third direction based on the received distance measurements obtained from the distance sensors defining the third direction; and generates a second command signal bases on the determined second inclination. In an embodiment, the plurality of distance sensors comprise a distance sensor not aligned with the distance sensors defining the second direction; and the control circuit, in operation, receives an indication of a distance measurement to the object in the first direction from the distance sensor not aligned with the distance sensors defining the second direction; determines a second inclination of the object in relation to a third direction different from the first and second directions, based on the indications of distance measurements received from the distance sensors; and generates a second command signal based on the determined second inclination. In an embodiment, the at least some of plurality of distance sensors are oriented along different axes, and, in operation the control circuit projects received indications of distance measurements on a first direction, taking into account angles between the axes and the first direction. In an embodiment, at least one of the distance sensors comprises a pulsed light source and light-sensitive elements, and, in operation, generates an indication of a distance to the object based on a duration between an instant of emission of a pulse of photons by the light source towards the object and an instant of detection of a pulse of photons reflected by the object and detected by the light-sensitive elements. In an embodiment, the light-sensitive elements comprise single photon avalanche (SPAD) diodes. In an embodiment, in operation, the control circuit generates the one or more command signals based on variations in the determined inclinations. In an embodiment, the plurality of distance sensors define a plurality of directions and comprise at least three distance sensors associated with each defined direction, and the control circuit, in operation, determines an inclination of the object with respect to each defined direction. In an embodiment, the command signals include signals to control operation of an apparatus and the device is communicatively coupled to the apparatus. In an embodiment, the command signals include signals to control operation of an apparatus, and the device is integrated into the apparatus.

In an embodiment, a system comprises: one or more inputs, which, in operation, receive indications of distance measurements; control circuitry coupled to the one or more inputs, which, in operation, determines one or more object inclinations in relation to one or more directions based on received indications of the distance measurements; and generates one or more command signals based on the determined inclinations; and one or more outputs coupled to the control circuitry, which, in operation, output generated control signals. In an embodiment, the system comprises: a plurality of distance sensors coupled to the one or more inputs and which, in operation, generate indications of distances to an object. In an embodiment, the system comprises: an apparatus coupled to the one or more outputs and which, in operation, is controlled based at least in part of the generated command signals.

In an embodiment, a non-transitory computer-readable memory medium's contents cause one or more processing devices to perform a method, the method comprising: determining one or more inclinations of an object in relation to one or more directions based on indications of distance measurements to the object; generating one or more command signals based on the determined inclinations; and controlling the one or more processing devices based on the one or more generated command signals. In an embodiment, the contents cause the one or more processing devices to generate the one or more command signals based on changes in the determined inclinations. In an embodiment, the contents cause the one or more processing device to determine at least one of the inclinations based on an angle between an axis of a distance sensor providing an indication of a distance measurement and a respective direction of the one or more directions.

BRIEF DESCRIPTION OF THE SEVERAL VIEWS OF THE DRAWINGS

Some examples of embodiments of the present disclosure will be described below in relation with, but not limited to, the following figures, in which.

DETAILED DESCRIPTION

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

Figure 1:
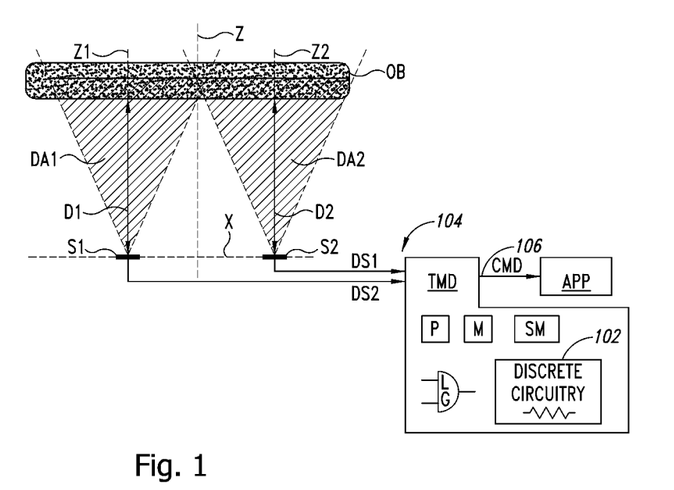
FIGS. 1 and 2 schematically represent a lateral view of a control device based on the detection of the arrangement of an object in space, according to one embodiment, the object being represented in different arrangements in FIGS. 1 and 2.
Figure 2:
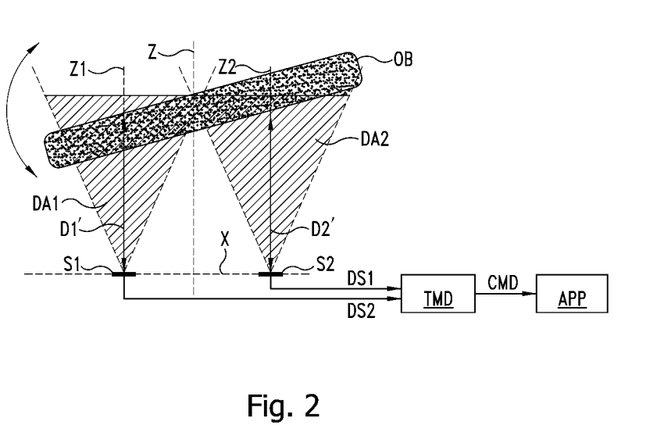

FIGS. 1 and 2 represent a control device according to one embodiment. The control device is configured to detect a movement of the user's hand in a detection field and supply an apparatus APP to be controlled with a control signal CMD determined according to the movement detected. The movement to be detected is for example a change in the inclination of the user's hand placed in the detection field. For this purpose, the control device comprises two distance sensors S1, S2, and an inclination assessing circuitry TMD connected to the sensors S1, S2. In operation, each sensor S1, S2 has a detection field DA1, DA2 represented in cone shape on the figures, generally extending along a symmetry axis of revolution corresponding to a detection axis Z1, Z2. The detection field of the control device is thus formed by the association of the fields DA1, DA2. The axes Z1, Z2 are substantially parallel to a measurement direction Z, and spaced out from each other by a distance between a minimum value sufficient to detect an inclination of the object to be detected with sufficient accuracy and a maximum value generally lower than the size of the object to be detected. An inclination of the object may be determined if the object is simultaneously in the two detection fields DA1, DA2.

Each of the sensors S1, S2 supplies the circuit or circuitry TMD with a detection signal DS1, DS2 representative of the distance D1, D1', D2, D2' along the detection axis Z1, Z2 between the sensor S1, S2 and an object OB present in the detection field DA1-DA2. The circuit TMD is configured to determine distance measurements of an object OB detected by the sensors S1, S2, according to signals sent by the latter, to assess an inclination of the object based on the distance measurements, and to determine the control signal according to the inclination thus assessed. In FIG. 1, the distances D1, D2 between the sensors S1, S2 and the object OB are substantially equal, indicating that one face of the object OB opposite the sensors S1, S2 is substantially parallel to an axis X linking the sensors S1, S2. In FIG. 2, the distance D1' between the sensor S1 and the object OB is lower than the distance D2' between the sensor S2 and the object OB. The result is that the object OB is in an inclined position in relation to the axis X. The signal CMD developed by the circuit TMD can then be representative of the difference D1-D2 (or D1'-D2') between the distances D1 and D2 (or D1' and D2') determined by the sensors S1, S2. The circuitry TMD may include a processor P, a memory M, a state machine SM, one or more logic gates LG, and discrete circuitry 102, which, in operation, may be employed alone or in various combinations to implement one or more functions of the circuitry TMD. The circuitry TMD also has one or more inputs 104 and one or more outputs 106. Various embodiments may or may not include one or more of the illustrated processor P, memory M, state machine SM, logic gates LG, and discrete circuitry 102, and may include other hardware components, such as adders, subtractors, multipliers, multiplexers, comparators, look-up tables, etc., and various combinations thereof.

Instead of, or in addition to, determining the control signal CMD according to a piece of information about the inclination of the object OB, the circuit TMD may determine the signal CMD according to a variation in inclination between two measurements spaced out by a certain time interval.

The control signal CMD can be used by the apparatus APP for example to move a pointer or an image in a direction corresponding to the axis X on a display screen.

Each distance sensor S1, S2 may comprise one or more SPAD-type diodes, associated with a common pulsed light source. According to one embodiment, each distance sensor comprises a pulsed light source and several SPAD diodes spread over several rows and several columns, for example 6 rows and 7 columns. Each distance sensor may be similar to those described in the applications FR 2 984 522 (US Pub. No. 2013/0153754) or FR 2 985 570 (US Pub. No. 2013/0175435) filed by the Applicant. If each sensor comprises its own pulsed light source, provision may be made to synchronize the light sources of the sensors to prevent them from interfering with the photodiodes of the other sensors. The range of distances for using the control device can extend from a few centimeters to about thirty centimeters from the SPAD diodes. It will be understood that other types of distance sensors may be employed. Each distance sensor may comprise one or more photodiodes associated with a pulsed light source which may be common to all the sensors or to a group of sensors of the control device.

Figure 3:
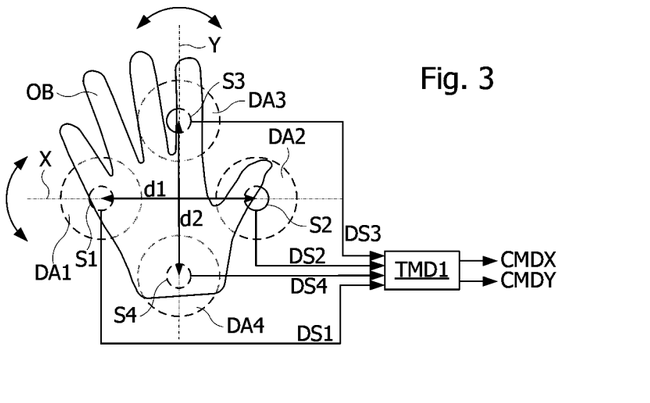
FIG. 3 represents a top view of a control device according to another embodiment, in connection with an object to be detected.

FIG. 3 represents a control device with four distance sensors S1, S2, S3, S4 located substantially in a same plane, to detect an inclination of an object OB (a hand in the example in FIG. 3) in relation to the direction X like in FIGS. 1 and 2) and in relation to a direction Y perpendicular to the direction X and parallel to a plane of the distance sensors S1-S4. For this purpose, the sensors S1, S2 are aligned in the direction X and the sensors S3, S4 are aligned in the direction Y. The sensors S1-S4 are arranged so that their respective detection fields DA1, DA2, DA3, DA4 are substantially oriented in a same direction perpendicular to the plane XY. Each sensor S1-S4 supplies an inclination assessing circuit TMD1 with a detection signal DS1-DS4 representative of the distance between the distance sensor and the object OB. The circuit TMD1 determines for each direction X, Y a control signal CMDX, CMDY representative of the difference between the distances supplied by the distance sensors aligned in that direction. The circuit TMD1 may include various components configured to implement the functionality of the circuit TMD1, such as, for example, the optional components discussed with respect to circuit TMD of FIG. 1 above.

In some embodiments, the distance sensors DS1-DS4 may not be equidistant between them in the directions X and Y. In this case, the inclination of the object OB in the directions X, Y can be determined by taking into account the distances between the sensors DS1 and DS2 in the direction X and between the sensors DS3 and DS4 in the direction Y. Thus, if d1 represents the distance between the sensors DS1 and DS2 and d2 the distance between the sensors DS3 and DS4, the inclinations IncX and IncY along the axes X and Y may be obtained with the following equations:

$$\text{Inc}X=(D1-D2)/d1 \text{ and } \text{Inc}Y=(D3-D4)/d2. \quad (1)$$

It can be noted that the axes Z1, Z2 of the detection fields DA1, DA2 (FIGS. 1 and 2) or DA1-DA4 (FIG. 3) of the distance sensors S1, S2 or S1-S4, are not necessarily parallel, but that some or all of them may be divergent. It is merely that the object OB the inclination of which is to be detected may be located substantially simultaneously in the detection fields of at least two sensors in each of the directions X, Y at a certain planned distance for using the control device. Indeed, the inclination of an object may be determined in relation to one of the directions X, Y if it is located at substantially the same time in the two fields DA1, DA2 or DA3, DA4 of two distance sensors S1, S2 or S3, S4 aligned in this direction.

Figure 4:
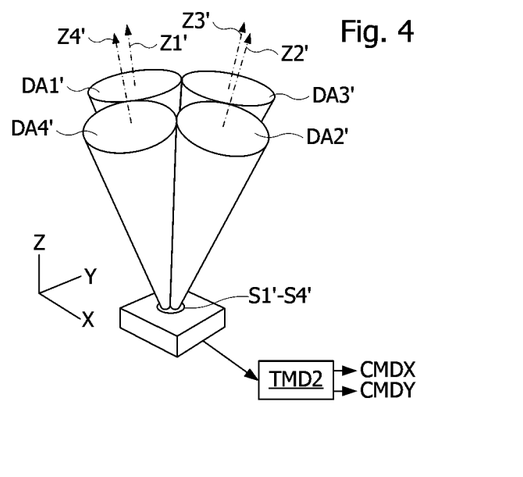
FIGS. 4 to 6 represent in perspective a control device, according to other embodiments.

FIG. 4 represents a control device comprising four distance sensors S1'-S4' respectively comprising divergent detection fields DA1'-DA4' and detection axes Z1'-Z4'. In the example in FIG. 4, the distance sensors S1'-S4' are grouped together on a reduced surface area and the cone-shaped detection fields are disjoint but contiguous in pairs. It will be understood that other arrangements of the distance sensors may be considered, taking into account, for example, the space available in the apparatus to be controlled, a range of distances for using the control device, and the dimensions of the object to be detected. Each distance sensor S1'-S4' supplies an inclination assessing circuit TMD2 with a detection signal representative of the distance between the distance sensor and the object OB along its detection axis Z1'-Z4'. The distance sensors S1' and S2' are aligned along the axis X and the distance sensors S3' and S4' are aligned along the axis Y. To compare the distances thus measured by the distance sensors with each other, the circuit TMD2 determines distances projected on a common axis Z perpendicular to the axes X and Y. For this purpose, the circuit TMD2 knows the angles between each of the axes Z1'-Z4' and the axis Z. The circuit TMD2 then determines, in relation to each of the directions X, Y, an inclination corresponding to the difference between the projections on the axis Z of the distances supplied by the distance sensors aligned in that direction. The circuit TMD2 determines for each of the directions X, Y, a control signal CMDX, CMDY corresponding to the inclination determined in relation to this direction. The circuit TMD2 may include various components configured to implement the functionality of the circuit TMD2, such as, for example, the optional components discussed with respect to circuit TMD of FIG. 1 above.

Figure 5:
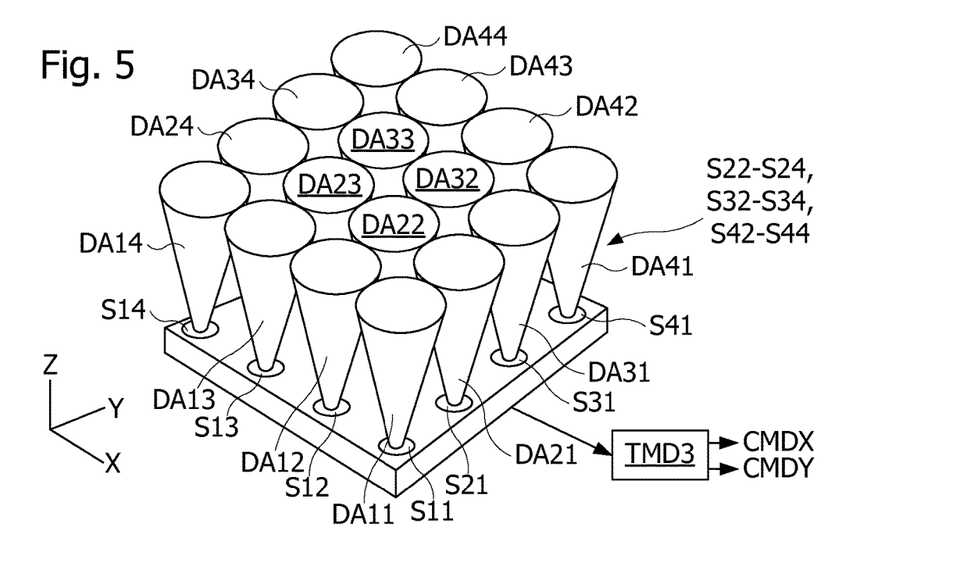
Figure 6:
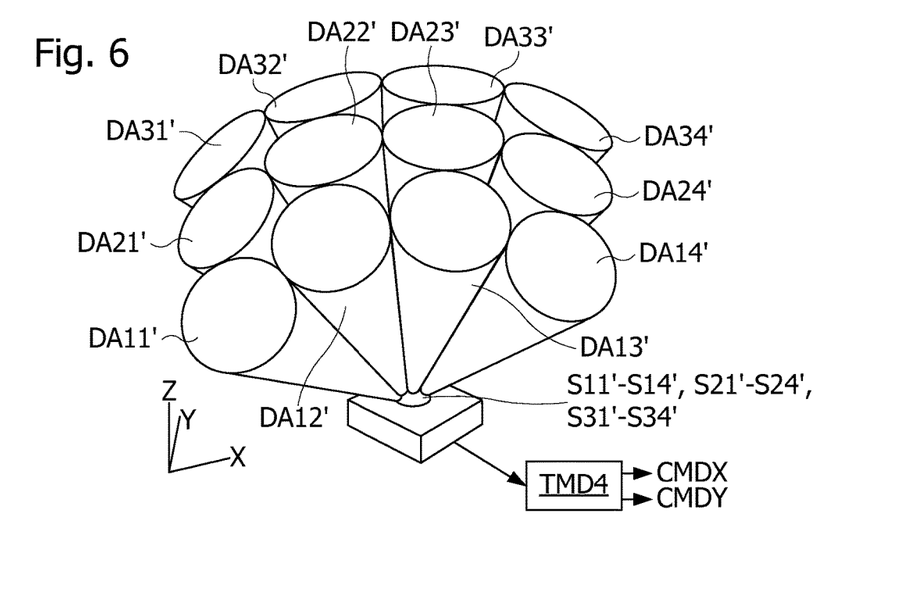

It will be understood that the number of distance sensors is not limited to two per inclination detection direction X, Y. Thus, FIGS. 5 and 6 represent a control device comprising several distance sensors aligned in the directions X and Y (FIG. 5) and arranged on a spherical surface (FIG. 6). In FIG. 5, the control device comprises sixteen distance sensors S11-S14, S21-S24, S31-S34, S41-S44 spread according to a matrix organization in rows and in columns in the plane XY. Each detection sensor S11-S44 has a respective detection field DA11-DA44 oriented in the detection direction Z perpendicular to the plane XY. Each distance sensor S11-S44 supplies an inclination assessing circuit TMD3 with a signal representative of a distance along the axis Z. Based on the signals received, the circuit TMD3 assesses an inclination of a detected object in relation to each of the axes X and Y, and determines a command CMDX along the axis X and a command CMDY along the axis Y, according to the assessed inclinations. A single inclination value per axis X, Y can be supplied by calculating averages for example applied to inclinations assessed from measurements supplied by two of the distance sensors. The circuit TMD3 may include various components configured to implement the functionality of the circuit TMD3, such as, for example, the optional components discussed with respect to circuit TMD of FIG. 1 above.

In FIG. 6, the control device comprises twelve distance sensors S11'-S14', S21'-S24', S31'-S34' respectively having cone-shaped detection fields DA11'-DA14', DA21'-DA24', DA31'-DA34'. The sensors S11'-S34' are arranged on a spherical surface so that the detection fields DA11'-DA34' are disjoint and oriented in divergent directions. Although the sensors S11'-S34' are not strictly aligned, alignment directions X, Y appear in the detection fields DA11'-DA34'.

In the example in FIG. 6, each detection field DA11'-DA34' is contiguous with two, three or four other detection fields. Each distance sensor S11'-S34' supplies an inclination assessing circuit TMD4 with a signal representative of a distance along the axis of the field of the distance sensor. Based on the signals received, the circuit TMD4 assesses by projection a detection distance along a detection axis Z for each distance sensor according to an angle between the axis Z and the axis of the detection field of the distance sensor. From the distances thus determined, the circuit TMD4 assesses an inclination of a detected object along each of the axes X and Y perpendicular to the axis Z, and determines a command CMDX along the axis X and a command CMDY along the axis Y, according to the assessed inclinations. The circuit TMD4 may include various components configured to implement the functionality of the circuit TMD4, such as, for example, the optional components discussed with respect to circuit TMD of FIG. 1 above.

Providing more than two sensors per inclination detection axis may obtain greater accuracy in the inclination value supplied and in the position of the detected object.

Furthermore, inclination values in two distinct directions may be obtained using only three non-aligned distance sensors. In this case, the distance sensors are not necessarily aligned in pairs in two perpendicular directions. If the axis X represents the alignment direction of two first distance sensors out of three, the command CMDY can then be determined by projecting on the axis Y the inclination value determined in relation to an alignment direction of the third distance sensor with one of the first two distance sensors, knowing the angle formed between the axis Y and the alignment direction of the third distance sensor. More generally, inclinations in relation to axes other than the alignment directions of the sensors can be determined by projection using angles between the alignment directions of the sensors and the directions of the axes in relation to which the inclinations are to be determined.

Thus, the control device in an embodiment may comprise only the sensors S1, S2, S3 in FIG. 3. An inclination can be determined from the distances D1, D2 measured by the sensors S1 and S2. If like in FIG. 3, the sensors S1 and S2 are arranged at a same distance from the axis Y, a distance measured from a point of the axis Y can be obtained by calculating the average of the distances D1 and D2, e.g., (D1+D2)/2. This calculated distance may be used with the distance measurement D3 supplied by the sensor S3 to determine an inclination of the object OB in relation to the axis Y.

It will be understood by those skilled in the art that the present disclosure is susceptible of various alternative embodiments and various applications. In particular, embodiments of the present disclosure not limited to controlling the displacement of an object (pointer, image) displayed on a display screen, but can apply to the control of other types of apparatuses, like, for example, a remotely controlled articulated arm.

Furthermore, the distance measurement direction Z is not necessarily perpendicular to the plane XY in which the distance sensors are located. The same is true in the event that the direction Z corresponds to the projection axis of the distance measurements when the sensors have different measurement directions. Indeed, it can be useful in certain applications to laterally shift the distance sensors of the detection field of the object the movements of which are to be detected.

It shall also be noted that the directions X, Y are not necessarily perpendicular to each other, but are merely distinct. Other values of the angle between the directions X, Y can be chosen in particular according to the application of the detection device.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in circuitry such as firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining distance measurements to an object in a first direction, using distance sensors aligned in a second direction different from the first direction;
   assessing, using processing circuitry, a first inclination angle of the object in relation to the second direction based on the distance measurements; and
   determining, using the processing circuitry, a first command of an apparatus based on the first inclination angle assessment.

2. The method according to claim 1, comprising:
   determining distance measurements to the object in the first direction, from distance sensors aligned in a third direction different from the first and second directions;
   assessing a second inclination angle of the object in relation to the third direction based on the distance measurements from the distance sensors aligned in the third direction, and
   determining a second command of the apparatus based on the second inclination angle assessment.

3. The method according to claim 1, comprising:
   determining a distance measurement of the object in the first direction, from a distance sensor not aligned with the distance sensors aligned in the second direction;
   assessing a second inclination angle of the object in relation to a third direction different from the first and second directions, based on the distance measurements supplied by the distance sensors; and
   determining a second command of the apparatus according to the second inclination angle assessment.

4. The method according to claim 1 wherein the distance sensors have detection axes having different orientations, the distance measurements being obtained by projecting measurements supplied by the distance sensors on the first direction, taking into account angles between each of the detection axes and the first direction.

5. The method according to claim 1 wherein a distance measurement supplied by a distance sensor is obtained based on a duration between an instant of emission of a pulse of photons by the distance sensor toward the object and an instant of detection of a pulse of photons reflected by the object and detected by the distance sensor.

6. The method according to claim 2 wherein at least one of the first and the second command is determined according to inclination angle variations determined based on the inclination angle assessments.

7. A device, comprising:
a plurality of distance sensors configured to, in operation, measure distances between the distance sensors and an object to be detected; and
a control circuit communicatively coupled to the plurality of distance sensors, configured to, in operation:
receive indications of the distance measurements from the distance sensors;
determine one or more indications of slope of the object in relation to one or more directions based on the received indications of the distance measurements; and
generate one or more command signals based on the determined indications of slope of the object.

8. The device of claim 7 wherein, in operation, the control circuit,
receives indications of distance measurements to the object in a first direction from distance sensors of the plurality of distance sensors that are aligned in a second direction different from the first direction;
determines a first indication of slope of the object in relation to the second direction based on the received distance measurements from the distance sensors that are aligned in the second direction; and
generates a first command signal based on the determined first indication of slope of the object.

9. The device according to claim 8 wherein, in operation, the control circuit,
receives indications of distance measurements to the object in the first direction from distance sensors of the plurality that are aligned in a third direction different from the first and second directions;
determines a second indication of slope of the object in relation to the third direction based on the received distance measurements obtained from the distance sensors aligned in the third direction; and
generates a second command signal based on the determined second indication of slope of the object.

10. The device according to claim 8 wherein,
the plurality of distance sensors comprise a distance sensor not aligned with the distance sensors aligned in the second direction; and
the control circuit, in operation,
receives an indication of a distance measurement to the object in the first direction from the distance sensor not aligned with the distance sensors aligned in the second direction;
determines a second indication of slope of the object in relation to a third direction different from the first and second directions, based on the indications of distance measurements received from the distance sensors; and
generates a second command signal based on the determined second indication of slope of the object.

11. The device according to claim 7, wherein the at least some of plurality of distance sensors have detection axes having different orientations, and, in operation the control circuit projects received indications of distance measurements on a first direction, taking into account angles between the detection axes and the first direction.

12. The device according to claim 7, wherein at least one of the distance sensors comprises a pulsed light source and light-sensitive elements, and, in operation, generates an indication of a distance to the object based on a duration between an instant of emission of a pulse of photons by the light source towards the object and an instant of detection of a pulse of photons reflected by the object and detected by the light-sensitive elements.

13. The device according to claim 11, wherein the light-sensitive elements comprise single photon avalanche (SPAD) diodes.

14. The device according to claim 7 wherein, in operation, the control circuit generates the one or more command signals based on variations in the determined indications of slope.

15. The device according to claim 7 wherein the plurality of distance sensors define a plurality of directions and comprise at least three distance sensors associated with each defined direction, and the control circuit, in operation, determines an indication of slope of the object with respect to each defined direction.

16. The device of claim 7 wherein the command signals include signals to control operation of an apparatus and the device is communicatively coupled to the apparatus.

17. The device of claim 7 wherein the command signals include signals to control operation of an apparatus, and the device is integrated into the apparatus.

18. A system, comprising:
one or more inputs, which, in operation, receive indications of distance measurements;
control circuitry coupled to the one or more inputs, which, in operation,
determines one or more object inclinations in relation to one or more directions based on received indications of the distance measurements; and
generates one or more command signals based on the determined inclinations; and
one or more outputs coupled to the control circuitry, which, in operation, output generated control signals, wherein an object inclination is an indication of a slope of an object in relation to at least one of the one or more directions.

19. The system of claim 18, comprising:
a plurality of distance sensors coupled to the one or more inputs and which, in operation, generate indications of distances to an object.

20. The system of claim 19, comprising:
an apparatus coupled to the one or more outputs and which, in operation, is controlled based at least in part of the generated command signals.

21. A non-transitory computer-readable memory medium whose contents cause a one or more processing devices to perform a method, the method comprising:
determining one or more inclinations of an object in relation to one or more directions based on indications of distance measurements to the object, wherein an inclination of an object is an indication of a slope of the object with respect to at least one of the one or more directions;
generating one or more command signals based on the determined inclinations; and
controlling the one or more processing devices based on the one or more generated command signals.

22. The non-transitory computer-readable medium of claim 21 wherein the contents cause the one or more processing devices to generate the one or more command signals based on changes in the determined inclinations.

23. The non-transitory computer-readable medium of claim 21 wherein the contents cause the one or more processing devices to determine at least one of the inclinations based on an angle between an axis of a distance sensor providing an indication of a distance measurement and a respective direction of the one or more directions.

* * * * *